(12) United States Patent
Kaytor et al.

(10) Patent No.: US 6,171,689 B1
(45) Date of Patent: Jan. 9, 2001

(54) FLAME RETARDANT MICROPOROUS MATERIALS

(75) Inventors: Scott R. Kaytor, Minneapolis; Richard A. Kollaja, St. Paul, both of MN (US)

(73) Assignee: 3M Innovative Properties Company, St. Paul, MN (US)

(*) Notice: Under 35 U.S.C. 154(b), the term of this patent shall be extended for 0 days.

(21) Appl. No.: 09/232,329

(22) Filed: Jan. 15, 1999

(51) Int. Cl.[7] .................................................. B32B 3/00
(52) U.S. Cl. ................................ 428/315.5; 428/315.9; 428/500; 442/183; 442/394; 442/398
(58) Field of Search ........................... 428/315.5, 315.9, 428/500; 442/183, 394, 398

(56) References Cited

U.S. PATENT DOCUMENTS

| | | | |
|---|---|---|---|
| 3,565,985 | 2/1971 | Schrenk et al. | 264/171 |
| 3,602,332 | * 8/1971 | Hollenbeck | 181/33 G |
| 4,247,498 | 1/1981 | Castro | 264/41 |
| 4,539,256 | 9/1985 | Shipman | 428/315.5 |
| 4,726,989 | 2/1988 | Mrozinski | 428/315.5 |
| 4,824,718 | * 4/1989 | Hwang | 428/284 |
| 4,849,311 | 7/1989 | Itoh et al. | 429/192 |
| 4,867,881 | 9/1989 | Kinzer | 210/490 |
| 4,877,679 | 10/1989 | Leatherman et al. | 428/224 |
| 4,908,278 | 3/1990 | Bland et al. | 428/500 |
| 5,169,712 | * 12/1992 | Tapp | 428/315.5 |
| 5,176,953 | 1/1993 | Jacoby et al. | 428/315.5 |
| 5,389,324 | 2/1995 | Lewis et al. | 264/171 |
| 5,427,842 | 6/1995 | Bland et al. | 428/213 |
| 5,589,122 | 12/1996 | Leonard et al. | 264/146 |
| 5,594,070 | * 1/1997 | Jacoby et al. | 525/88 |
| 5,599,602 | 2/1997 | Leonard et al. | 428/56 |
| 5,660,922 | 8/1997 | Herridge et al. | 428/214 |

FOREIGN PATENT DOCUMENTS

WO 95/17699   6/1995   (WO).

OTHER PUBLICATIONS

Kirk–Othmer Encyclopedia of Tech., 4th Ed., vol. 10, pp 954–998, John Wiley & Sons, NY, NY, 1993.

* cited by examiner

Primary Examiner—Helen L. Pezzuto
(74) Attorney, Agent, or Firm—Kent S. Kokko (57) ABSTRACT

Microporous articles formed by thermally induced phase separation from a diluent in combination with a thermoplastic polymer and a flame retardant providing novel flame retardant articles. Such articles are useful in clothing, wall or roofing barriers, optical films in electronic devices (such as light reflective and dispersive films), printing substrates and electrical insulation.

19 Claims, 4 Drawing Sheets

FLAME RETARDANT MICROPOROUS MATERIALS

FIELD OF THE INVENTION

The present invention relates to flame retardant microporous articles (e.g., films, sheets or membranes) formed from a polymer and diluent composition in which the diluent is phase separated from a thermoplastic polymer to make the article.

BACKGROUND OF THE INVENTION

Microporous films, sheets or membranes have a structure that enables fluids to flow through them. The effective pore size is at least several times the mean free path of the flowing molecules, namely, from several micrometers down to about 100 Angstroms. Such sheets are generally opaque, even when made from an originally transparent material, because the surfaces and internal structure scatter visible light.

Microporous membranes or films have been utilized in a wide variety of applications, such as the filtration of solids, the ultrafiltration of colloidal matter, diffusion barriers or separators in electrochemical cells, in the preparation of synthetic leather, and in the preparation of fabric laminates. The latter utilities require the membranes to be permeable to water vapor but not liquid water when preparing such articles as shoes, raincoats, outer wear, camping equipment such as tents, and the like. Moreover, microporous membranes or films are utilized for filtration of antibiotics, beer, oils, bacteriological broths, as well as for the analysis of air, microbiological samples, intravenous fluids, vaccines, and the like. Microporous membranes or films are also utilized in the preparation of surgical dressings, bandages, and in other fluid transmissive medical applications.

Microporous membranes or films may be laminated to other articles to make laminates having particular utility. Such laminates may include a microporous layer and an outer shell layer to provide a particularly useful garment material. Further, the microporous films or membranes may be utilized as a tape backing to provide such products as vapor transmissive wound dressings or hair setting tapes.

The art is replete with various methods of producing microporous materials. One useful technology found is thermally induced phase separation (TIPS). The TIPS process is based on the use of a polymer that is soluble in a diluent at an elevated temperature and insoluble in the diluent at a relatively lower temperature. The "phase separation" can involve a solid-liquid phase separation, or a liquid—liquid phase separation. This technology has been employed in the preparation of microporous materials wherein thermoplastic polymer and a diluent are separated by a liquid—liquid phase separation as described in U.S. Pat. Nos. 4,247,498 and 4,867,881. A solid-liquid phase separation has been described in U.S. Pat. No. 4,539,256 wherein the thermoplastic polymer on cooling crystallizes out. The use of nucleating agents incorporated in the microporous material is also described as an improvement in the solid-liquid phase separation method, U.S. Pat. No. 4,726,989.

SUMMARY OF THE INVENTION

The present invention provides new single and multilayer flame retardant microporous polymeric materials, prepared by a solid-liquid phase separation process, which contain an integral flame retardant. The microporosity is achieved by stretching the film, by diluent removal or by a combination of both techniques.

Accordingly, the present invention in its first aspect is a microporous material containing a crystallizable polymer component and at least 10 parts by weight of a flame retardant additive. More specifically, the present invention is a microporous material including:

(a) about 20 (preferably 30) to 90 parts by weight of a polymer component, (b) about 0.1 to 70 (preferably greater than 10, most preferably 15 to 70) parts by weight of an diluent component, the diluent component being miscible with the polymer component at a temperature above the liquid-solid phase separation temperature, the diluent component able to phase separate from the polymer component through crystallization separation upon cooling below the liquid-solid phase separation temperature; and (c) about 10 to 60 (preferably 15 to 40) parts by weight of a flame retardant additive.

A second aspect of the present invention is a method of making a microporous article including the steps of:

(a) melt-blending to form a solution comprising about 10 to 75 parts by weight of a crystallizable thermoplastic polymer component, about 15 (preferably 20) to 80 parts by weight of an diluent component that is miscible with the polymer component at a temperature above the liquid-solid phase separation temperature, and 10 to 60 parts by weight of a flame retardant additive;

(b) forming a shaped article of the melt-blended solution, (c) cooling said shaped article to a temperature at which phase transition occurs between said diluent and said polymer component through crystallization precipitation of the polymer component to form a network of polymer domains, and (d) creating porosity by stretching said article at least in one direction to separate adjacent crystallized polymer domains from one another, and/or by removing at least part of the diluent component, to provide a network of polymer spherulites connected by fibrils.

A third aspect of the present invention is a multilayer microporous film containing at least one layer of a microporous material as described above.

The article formed from liquid-solid phase separation, before orientation, is solid and generally transparent comprising an aggregate of a first phase of spherulites of crystallized thermoplastic polymer and a second phase of the diluent component. The flame retardant additive may be dissolved in the polymer component and/or the diluent component or may form a third phase of flame retardant dispersed in the matrix as a solid or liquid. The polymer domains may be described as spherulites and aggregates of spherulites of the polymer. Adjacent domains of polymer are distinct but they have a plurality of zones of continuity. That is, the polymer domains are generally surrounded or coated by the diluent component, but not completely. There are areas of contact between adjacent polymer domains where phase separation has not occurred and there is a continuum of polymer from one domain to the next adjacent domain in such zones of continuity.

On orienting or stretching, the polymer domains are pulled apart, permanently attenuating the polymer in the zones of continuity thereby forming fibrils that interconnect the polymer spherulites, and forming minute voids between coated particles, creating a network of interconnected micropores, thereby rendering the article permanently translucent. On orienting or stretching, the diluent component remains coated on or surrounds, at least partially, the surfaces of the resultant thermoplastic polymer domains. The degree of coating depends upon the affinity of the compound for the surface of the polymer domain, whether the compound is a liquid or solid, whether orientation dislodges or disrupts the coating and on other factors which may be relevant. The domains are usually at least partially coated after orientation. Substantially all of the domains appear to be connected by fibrils. The size of the micropores is controlled by varying the degree of stretching, percent of diluent and flame retardant additive component, melt-quench conditions, diluent component removal and heat-stabilization procedures. The fibrils for the most part do not appear to be broken by stretching but they are permanently stretched beyond their elastic limit so that they do not elastically recover to their original position when the stretching force is released. As used herein, "orienting" means such stretching beyond the elastic limit so as to introduce permanent set or elongation of the article. Stretching below the elastic limit is also effective if the article is annealed or heat-set while under tension.

The microporous article may comprise a single microporous layer, or may comprise a multilayer article having at least one microporous layer as defined above. The article may include additional microporous layers, or additional nonporous layers, or one or more porous layers (such as a nonwoven layer) depending on the application and requirements. For example, the microporous article may comprise one or more microporous layers laminated or otherwise bonded to one or more nonporous film layers or one or more nonwoven layers. The present invention also provides a multilayer film having a unified construction; wherein the construction comprises at least 5, preferably 10, more preferably at least 13 substantially contiguous layers of organic polymeric material; the construction comprising layers comprising a flame retardant film alternating with layers comprising a film that is not flame retardant.

The multilayer microporous films may include an $(AB)_n$ construction, with either A and/or B layers as the outermost layers (e.g., $(AB)_nA$, $(BA)_nB$, or $(AB)_n$). In such constructions, each of the B layers has flame retardant properties as a result of the incorporation of a flame retardant additive or the use of an inherently flame retardant polymer, which may be the same or different in each layer, and each of the A layers does not have flame retardant, which may be the same or different in each layer and "n" is an integer from 0 to 1000, preferably 5 to 200, most preferably 5 to 50. In a particularly preferred embodiment, microporous layers are arranged in a A(BA)nBA multilayer construction.

The microporous article may comprise a single microporous layer, or may comprise a multilayer article having at least one microporous layer as defined above. The article may include additional microporous layers, or additional nonporous layers, or one or more porous layers (such as a nonwoven layer) depending on the application and requirements.

The present invention also provides a process of preparing a flame-retardant multilayer film. The process includes melt processing organic polymeric material to form a unified construction of at least 5 substantially contiguous film layers of organic polymeric material, wherein at least one layer of the organic polymeric material comprises a microporous flame retardant film layer. Additional flame retardant layers can alternate with microporous non-flame retardant layers. Preferably, all the layers are simultaneously melt processed, and more preferably, all the layers are simultaneously coextruded.

A further aspect of the present invention provides a process of preparing a multilayer film, the process comprising melt processing organic polymeric material to form a unified construction of at least 5 substantially contiguous layers of organic polymeric material, the construction comprises film layers comprising at least one microporous flame retardant film layer, and microporous non-flame retardant film layers.

In a particularly preferred embodiment, microporous layers are arranged in a $A(BA)_nBA$ multilayer construction where A represents microporous layers containing no flame retardant additive and B represents microporous layers that contain a flame retardant additive.

The microporous articles of the invention may be used in many applications where non-flammability is desired. Heretofore, rendering microporous films flame-retardant has been difficult. Porous articles are generally more flammable than nonporous articles due to the relative large surface area exposed to air. Additionally "oil-in" microporous films, in which diluent is retained in the porous structure, generally enhance the flammability of the article by providing a relatively volatile fuel source. Unexpectedly, despite the large surface area of the microporous article and the presence of a flammable diluent component, porous articles of the present invention may be made which are difficult to ignite, propagate flame slowly, and which may be self-extinguishing. The multilayer microporous films have improved flame resistance over single-layer blending and may have a particle free surface that can eliminate the fouling of substrates and delamination of flame retardant particles from the microporous film surface.

DETAILED DESCRIPTION

The microporous material of the present invention includes a crystallizable polymer component, and diluent component, and 10 to 60 parts by weight of a flame retardant additive.

As used herein, the term "polymer component" refers only to conventional polymers that are melt-processible under ordinary melt-processing.

As used herein, the term "crystalline" with regard to polymer components includes polymers which are at least partially crystalline, preferably having a crystallinity of greater than 20 weight % as measured by Differential Scanning Calorimetry (DSC). Crystalline polymer structures in melt-processed polymers are known to those skilled in the art.

As used herein, the term "melting temperature" refers to the temperature at or above which a polymer component alone or in a blend with a diluent component will melt.

As used herein, the term "crystallization temperature" refers to the temperature at or below which a polymer component alone or in a blend with a diluent, will crystallize.

As used herein, the term "liquid-solid phase separation temperature" refers to the temperature at or below which a solution of a compatible polymer and diluent mixture, i.e., a homogeneous polymer diluent solution, phase separates by crystallization of the polymer component.

As used herein, the term "diluent component" refers to the diluent component in solid-liquid phase separation.

As used herein, the term "compatible mixture" refers to a fine dispersion of one polymer component (less than 1 micrometer particle size) in a continuous matrix of a second polymer component or a fine inter-penetrating network of both polymer components, and "compatible" refers to two or more polymers capable of forming such dispersions or interpenetrating networks with each other. Compatibility requires that at least one polymer component of a compatible mixture be at least partially miscible with the other polymer components.

As used herein, the term "oil-in" refers to a microporous film made by solid-liquid phase separation in which the diluent component is not removed.

As used herein, the term "oil-out" refers to a microporous film made by solid-liquid phase separation in which the oil component is essentially removed.

As used herein "flame retardant" means polymers in which basic flammability has been reduced by some modification as measured by one of the accepted test methods such as the UL 94 Horizontal Burn test or the DIN 4102 Vertical Burn test. "Flame retardant additive" means a compound or mixture of compounds that when incorporated (either mechanically or chemically) into a polymer serves to slow or hinder the ignition or growth of the fire.

"Flame retardant microporous articles" means polymeric films, membranes, sheets, or other profiles which have been rendered flame retardant by means of a flame retardant additive.

In general, flame retardant additives must generally form a homogeneous mixture (dispersion or solution) with the polymer and diluent components at the processing temperatures used, and preferably melt below the processing temperature. In order that the flame retardant additive not weaken the structure of the ultimate article (such as a film or sheet), the additive should not inhibit the crystal nucleation of the polymer component during phase separation such that the microstructure grows so large as to adversely weaken the film.

Useful flame retardant additives include halogenated organic compounds, organic phosphorus-containing compounds (such as organic phosphates), inorganic compounds and inherently flame retardant polymers. These additives are added to or incorporated into the polymeric matrix of the microporous article in sufficient amounts to render an otherwise flammable polymer flame retardant as measured either the Underwriters Laboratory Horizontal Burn test (UL 94 HB) or the Deutsches Institut für Normung Vertical Burn test (DIN 4102 B2). The nature of the flame retardant additive is not critical and a single additive may be used. Optionally, it may be found desirable to use a mixture of two or more individual flame retardant additives.

Halogenated organic flame retardant additives are thought to function by chemical interaction with the flame: the additive dissociates into radical species that compete with chain propagating and branching steps in the combustion process. Useful halogenated additives are described, for example, in the Kirk-Othmer Encyclopedia of Technology, 4$^{th}$ Ed., vol. 10, pp 954–76, John Wiley & Sons, N.Y., N.Y., 1993.

Included within the scope of halogenated organic flame retardant additives are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogenated organic flame retardant additives for this invention are aromatic halogen compounds such as brominated benzene, chlorinated biphenyl, or a compound comprising two phenyl radicals separated by a divalent linking group (such as a covalent bond or alkylene group) and having at least two chlorine or bromine atoms per phenyl nucleus, chlorine containing aromatic polycarbonates, and mixtures of at least two of the foregoing. Especially preferred are decabromodiphenyl oxide, pentabromodiphenyl oxide, and octabromodiphenyl oxide.

Among the useful organic phosphorus additives are organic phosphorus compounds, phophorus-nitrogen compounds and halogenated organic phosphorus compounds. Often organic phosphorus compounds function as flame retardants by forming protective liquid or char barriers, which minimize transpiration of polymer degradation products to the flame and/or act as an insulating barrier to minimize heat transfer.

In general, the preferred phosphate compounds are selected from organic phosphonic acids, phosphonates, phosphinates, phosphonites, phosphinites, phosphine oxides, phosphines, phosphites or phosphates. Illustrative is triphenyl phosphine oxide. These can be used alone or mixed with hexabromobenzene or a chlorinated biphenyl and, optionally, antimony oxide. Phosphorus-containing flame retardant additives are described, for example, in Kirk-Othmer (supra) pp. 976–98.

Typical of the preferred phosphorus compounds to be employed in this invention would be those having the general formula and nitrogen analogs thereof where each Q represents the same or different radicals including hydrocarbon radicals such as alkyl, cycloalkyl, aryl, alkyl substituted aryl and aryl substituted alkyl; halogen, hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides or phosphinic acid amides.

Among the useful inorganic flame retardant additives include compounds of antimony, such as include antimony trioxide, antimony pentoxide, and sodium antimonate; boron, such as barium metaborate, boric acid, sodium borate and zinc borate; aluminum, such as aluminum trihydrate; magnesium, such as magnesium hydroxide; molybdenum, such as molybdic oxide, ammonium molybdate and zinc molybdate, phosphorus, such as phosphoric acid; and tin, such as zinc stannate. The mode of action is often varied and may include inert gas dilution, (by liberating water for example), and thermal quenching (by endothermic degradation of the additive). Useful inorganic additives are described for example in Kirk-Othmer (supra), pp 936–54.

The particle size of the inorganic additive (or organic additives which do not melt) should be less than the thickness of the flame retardant film layer(s) into which it is incorporated to ensure uniform thickness of the article. Preferably the particle size is less than one-half, more preferably less than one-third the thickness of the flame retardant film layer(s). In general, the smaller the particle, or the more surface area the particle presents, the more effective the flame retardant properties.

Especially usefull are mixed additives of an antimony additive and a halogenated organic additive, describes as "antimony-halogen" additives which produces an especially effective flame retardant. The two additives react synergistically at flame temperatures to produce an antimony halide or oxyhalide which produce radical species (which compete with chain propagating and branching steps in the combustion process) as well as promoting char formation.

The flame retardant additive may be chosen from fine particles of an inherently flame retardant polymer. Inherently flame retardant polymers, due to their chemical structure, either do not support combustion, or are self-extinguishing. These polymers often have increased stability at higher temperatures by incorporating stronger bonds (such as aromatic rings or inorganic bonds) in the backbone of the polymers or are highly halogenated. Examples of inherently flame retardant polymers include poly(vinyl chloride), poly(vinylidine chloride), chlorinated polyethylene, polyimides, polybenzimidazoles, polyether ketones, polyphosphazenes, and polycarbonates. Useful inherently flame retardant films generally have a Limiting Oxygen Index (LOI) of at least 28% as determined by ASTM D-2863-91.

The additives are generally incorporated into the flame retardant film layers by addition of the additive(s) to the melt prior to film formation. The materials may be added neat, or incorporated into the diluent or polymer. When using an inherently flame-retardant polymer as an additive, it may be melt blended if compatible. Alternatively the inherently flame-retardant polymer additive may be added as fine particles to the melt. In the case of halogenated organic additives and organic phosphorus additives, they may be added neat in the form of liquid or solids to the melt. Care should be exercised to choose an additive that is stable at the melt temperature of the polymer.

Additives are added in sufficient amounts to render the microporous article flame retardant. Typically the additives are added in amounts 10 to 60 parts by weight (preferably 15 to 40 p.b.w.).

Preferably the diluent is retained in the microporous article due to cost considerations. If not removed, the "oil-in" microporous article preferably contains greater than 10 parts by weight diluent (most preferably 15 to 75 parts by weight) diluent. Oil-out microporous articles typically contain less that ten parts by weight of diluent after oil removal. If an "oil-out" microporous article is desired, the flame retardant additive may be chosen so that it is retained during the diluent removal step. Flame retardant additives that have melting points above the processing temperatures may be used, and are incorporated into the microporous matrix as small particles. Such additives may include high melting organic compounds such as decabromodiphenyl oxide, inorganic additives such as aluminum trihydrate, or inherently flame-retardant polymers. Alternatively, the additive may be chosen so that it is insoluble in a solvent used to remove the diluent.

Crystallizable polymers suitable for use in the preparation of microporous materials of the invention are well known and readily commercially available. The useful polymers are melt processable under conventional processing conditions. That is, on heating they will easily soften and/or melt to permit processing in conventional equipment such as an extruder to form a sheet. Crystallizable polymers, upon cooling their melt under controlled conditions, spontaneously form geometrically regular and ordered chemical structures. Preferred crystallizable polymers for use in the present invention have a high degree of crystallinity and also possess a tensile strength of at least about 70 kg/cm$^2$ (1000 psi).

Examples of suitable crystallizable polymers include addition polymers such as polyolefins and condensation polymers such as polyesters and polyamides. Useful polyolefins preferably include the polymers of ethylene and propylene but also may include methylpentene, butene, 1-octene, styrene, and the like, and copolymers of two or more such olefins that may be polymerized to contain crystalline and amorphous segments and mixtures of stereospecific modification of such polymers e.g., mixtures of isotactic polypropylene and atactic polypropylene, isotactic polystyrene and atactic polypropylene. Useful polyesters include polyethyleneterephthalate, polybutyleneterephthalate, polyhexamethyleneadipate, polyhexamethylenesuccinate, and polyester copolymers. Useful polyamides include polyhexamethyleneadipamide, polyhexamethylenesebacamide and polycaprolactam. These are described, for example, in U.S. Pat. Nos. 4,247,498, 4,539,256, 4,726,989, 4,867,881, and 4,849,311, which are incorporated herein by reference.

If desired, a nucleating agent may be used. The nucleating agent employed in the present invention may serve the important functions of inducing crystallization of the polymer from the liquid state and enhancing the initiation of polymer crystallization sites so as to hasten the crystallization of the polymer. Because the nucleating agent serves to increase the rate of crystallization of the polymer, the size of the resultant polymer particles or spherulites is reduced. The use of nucleating agents in the preparation of microporous materials has been described in U.S. Pat. No. 4,726,989 (Mrozinski), the disclosure of which is incorporated herein by reference.

Some examples of nucleating agents which have been found useful for purposes of the present invention include aryl alkanoic acid compounds, benzoic acid compounds, and certain dicarboxylic acid compounds. In particular, the following specific nucleating agents have been found useful: dibenzylidine sorbitol, titanium dioxide ($TiO_2$), talc, adipic acid, benzoic acid, and fine metal particles. It will be understood that the foregoing nucleating agents are given by way of example only, and that the foregoing list is not intended to be comprehensive. Other nucleating agents which may be used in connection with thermoplastic polymers are well known, and may also be used to prepare microporous materials in accordance with the present invention. Additionally, flame retardant additives should be selected that do not adversely affect the heterogeneous nucleation function of the nucleating agent, when such agents are employed. Compounds suitable as the diluent component for blending with the crystallizable polymer to make the microporous materials of the invention are liquids or solids at room temperature and in which the crystallizable polymer will dissolve to form a solution at the melting temperature of the crystallizable polymer but will phase separate on cooling at or below the crystallization temperature of the crystallizable polymer. Preferably, these compounds have a boiling point at atmospheric pressure at least as high as the melting temperature of the crystallizable polymer. Compounds having lower boiling points may be used in those instances where superatmospheric pressure may be employed to elevate the boiling point of the compound to a temperature at least as high as the melting temperature of the crystallizable polymer. Generally, suitable diluent compounds have a solubility parameter and a hydrogen bonding parameter within a few units of the values of these parameters for the crystallizable polymer.

The useful diluents are those that form solutions with the polymer component at elevated temperatures and phase separate upon cooling and include various types of organic compounds including paraffinic (alkane) and aromatic acids, alkanes, aromatic and cyclic alcohols, aldehydes, primary and secondary amines, aromatic and ethoxylated amines, diamines, amides, esters and diesters, ethers, ketones and various hydrocarbons and heterocylics. Particularly useful diluents are, for example, phthalates, such as dioctyl-, diethyl- and dibutyl-; mineral oil; mineral spirits; triethyleneglycol; methylnonylketone; decanoic and oleic acids, and decyl alcohol.

Some examples of blends of crystallizable polymers and blending compounds which are useful in preparing microporous materials according to the present invention include: polypropylene with mineral oil, dioctyl phthalate or mineral spirits; polypropylene-polyethylene copolymer with mineral oil; polyethylene with mineral oil or mineral spirits; polyethylene terephthalate or polybutylene terephthalate with diethylphthalate; polyester elastomer with dioctylphthalate, and nylon 6 (polycaprolactam) with triethylene glycol.

A particular combination of polymer and blending compound may include more than one polymer, i.e., a mixture of two or more polymers, and/or more than one blending compound. Mineral oil and mineral spirits are examples of mixtures of blending compounds since they are typically blends of hydrocarbon liquids. Blends of liquids and solids may also serve as the blending compound. It should be understood that the polymer may include blended therein certain conventional additive materials in limited quantity so as not to interfere with the formation of the microporous material of the invention and so as not to result in unwanted exuding of the additive.

Particularly useful are polypropylene and high density polyethylene. Mixtures of polymers may also be used as long as they are miscible with the diluent upon heating and form compatible mixtures upon cooling. While high density polyethylene films have lower use temperatures, they may be preferred over polypropylene films since they yield better hand softness, and tear resistant characteristics, especially with "oil-out" films.

Miscibility and compatibility of polymers are determined by both thermodynamic and kinetic considerations. Common miscibility predictors for non-polar polymers are differences in solubility parameters or Flory-Huggins interaction parameters. Unlike miscibility, compatibility is difficult to define in terms of exact thermodynamic parameters, since kinetic factors, such as melt processing conditions, degree of mixing, and diffusion rates can also determine the degree of compatibility.

Some examples of compatible polyolefin blends are: low density polyethylene and ethylene propylene diene terpolymer; low density polyethylene and ethylene vinyl acetate copolymer; polypropylene and ethylene propylene rubber; polypropylene and ethylene alpha-olefin copolymers; polypropylene and polybutylene.

Compatibility affects the range of useful polymer concentrations. If the polymers are incompatible, that range of compositions can be quite narrow, restricted to very low polymer concentrations, and of minimal practical usefulness in making the articles of this invention. However, if polymers are compatible, a common solvent can promote their miscibility into the composition regions of much higher polymer concentrations, thus allowing the use of common processing techniques such as extrusion to make articles of this invention. Under these conditions, all components in the melt are miscible and phase-separate by crystallization precipitation upon cooling below the phase separation temperature. The rate of cooling is quite rapid (preferably sufficient so that the melt-blended solution cools below the phase boundary in 30 seconds or less) and controlled by the process conditions that minimize the size of phase-separated microdomains and provides uniformity on a microscopic level.

Compatibility also affects the film uniformity. Cast films that are made from compatible blends of polymer are transparent which confirms the uniformity on a microscopic level. This uniformity is of great importance for successful post-processing: films with a lesser degree of uniformity made from incompatible polymers break easily during stretching when stretching is used to create porosity. Film uniformity is also important in some applications, such as thermal shutdown battery separators, for which reliable shutdown performance on a microscopic level is desirable to prevent local overheating when a short circuit develops across the separator.

The microporous article or at least one microporous layer in a multilayer article may be prepared by melt-blending a polymer component, i.e. polymer or polymer mixture above described, to form a solution by heating the mixture with an diluent component at a temperature above the melting temperature of the polymer.

The diluent component may further comprise 50 wt. % or more of a crosslinkable diluent oil to provide an economical method for making a microporous film from which the diluent will not leach out. The crosslinkable diluent is crosslinked within the porous matrix of the polymer providing covalent bonding and thereby immobilizing the oil diluent. The use of crosslinkable diluents in microporous membranes has been described in Assignee's copending patent application Ser. No. U.S. Ser. No. 09/081,239 the teachings of which are incorporated herein by reference.

Such crosslinkable diluents are those that are capable of forming a solution with a polymer component (polymer or polymer mixture) at an elevated temperature, and also capable of permitting the polymer component or components to phase separate when cooled. These crosslinkable diluents can be synthetic or natural drying oils of the unsaturated oil family. The natural drying oils are those extracted from seeds or trees and are, for example, linseed oil, soybean oil, tall oil, tung oil, oitica oil, corn oil, safflower oil, sunflower oil, grapeseed oil, hemp oil, perilla oil, poppyseed oil, rubberseed oil and walnut oil. Synthetic drying oils include modified drying oils which can comprise natural drying oils and/or their fatty acids (for example, oleic, linoleic, and linolenic acids) with synthetic resins such as polyesters which can be modified with polybasic acids, e.g., phthalic acid, which in turn are referred to as oxidizing alkyds. Tung oil (conjugated) dries more readily than linseed oil (non-conjugated triene), which dries more readily than soya oil (non-conjugated diene). Preferred crosslinkable diluents are the natural oils such as, for example, linseed oil, sunflower oil, and safflower oil. The most preferred crosslinkable diluent is linseed oil.

The microporous article may also contain other additive materials in limited quantity so as also not to interfere with the formation of the microporous article of the present invention, and so as not to result in unwanted exuding of the additive. Such additives may include anti-static materials, plasticizers, fluorochemicals, UV absorbers, nucleating agents, hygroscopic metal salts alkoxides and the like. The amount of total additive content is typically less than 10% of the weight of the polymeric mixture, preferably less than 6% by weight, and more preferably less than 2% by weight.

The melt solution is prepared by mixing the polymer component, the diluent component, and the flame retardant additive under agitation such as that provided by an extruder and heating until the temperature of the mixture is above the liquid-solid phase separation temperature. At this point the mixture becomes a melt solution or single phase. Once the melt solution is prepared, a shaped article is then formed by known methods, for example, employing an extruder.

The preferred article according to the present invention is in the form of a sheet or film although other article shapes are contemplated. For example, the article may be in the form of a tube or filament. Other shapes which can be made according to the disclosed process are also intended to be within the disclosed invention.

Cooling of the shaped article occurs either in the extruder, at or near the die at the extruder discharge, or preferably by casting the shaped material onto a casting wheel. The microporous films of the present invention are typically cooled by casting on a patterned drum. Protrusions in the pattern result in less contact between the metal cooling drum and the hot solution (or melt); thus slowing the cooling when compared to that observed with a smooth (non-patterned) drum. Cooling causes the phase transition to occur between the diluent and the polymer components. This occurs by crystallization precipitation of the polymer component to form a network of polymer domains. The shaped material (e.g. the oil-in cast film) is nonporous at this stage and is rendered microporous by orientation (stretching), diluent removal or a combination thereof. The stretching is at least in one direction to separate adjacent crystallized polymer domains from one another to provide a network of interconnected micropores. Stretching may be achieved by pulling the films with either a length orienter and/or tenter (i.e. orienting down-web, cross-web or both). When the film is pulled in more than one direction, the degree of stretch may be the same or different in each direction. If a crosslinkable oil is used, preferably the film is stretched prior to significant crosslinking of the crosslinkable oil.

An extruder with either a blown film die or a cast film die and a casting wheel can be used to initiate the thermal phase separation process as described above. These resulting films can be washed and/or stretch oriented in either a uniaxial or biaxial manner to yield a microporous film. Further, the oriented films may be annealed or heat-set to retain the orientation imparted. These microporous films are both porous and breathable as demonstrated by air-flow/Gurley values in the range of 25 to 1000 sec/50 cc and moisture vapor transmission rates (MVTR's) in the range of 5,000 to 6,000 g/m$^2$/day. The films are thus suitable for many breathable garment and barrier film applications.

The process may further comprise a diluent removal step. This can be done using stretched or unstretched film to achieve the desired degree of porosity. The removal of diluent may be carried out by extraction, displacement or other known methods. The diluent component may be removed by any suitable solvent or displacement agent that is additionally a non-solvent for the polymer component and the flame retardant additive. The miscibility or solubility of the diluent in the chosen solvent will determine the effectiveness of the chosen solvent and the time required to fully or partially remove the diluent component. If a displacement agent is used, it is preferably chosen from liquid flame retardant additives which can displace the diluent component and enhance the flame retardant properties of the article.

When the flame retardant additive melts below the liquid-solid phase separation temperature, the additive frequently remains in the diluent phase upon cooling. Thus, porosity should generally be achieved through stretching since the flame retardant may be severely diminished if a substantial amount of the diluent is removed, even if the flame retardant is not miscible or soluble in the extraction solvent. Often, microporous films made with flame retardants that melt below the liquid-solid phase separation temperature can be thinner and appear more homogenous due to the lack of flame retardant particles in the polymer matrix. Conversely, when the flame retardant additive melts above the liquid-solid phase separation temperature, the additive frequently remains in the polymer matrix as discreet particles upon cooling and are generally not removed during an diluent removal step.

The process may further include a bonding step whereby the microporous film is bonded to one or more additional layers that may comprise a web, such as a film, scrim, fabric or other substrate, that may be porous or nonporous. Preferably the bonding step comprises a lamination step whereby the microporous film and the web are pressed together in a nip between rollers and heated sufficiently to soften either the microporous film or additional layer. The lamination apparatus may comprise, for example, a first smooth roller and second roller having an embossing pattern. The bonding of the microporous film to a web may improve mechanical properties, such as tear resistance or transverse strength, of the microporous article and render it more suitable for use as moisture barrier films used in home and building construction.

If the diluent is removed, the resultant microporous article may be imbibed with various fillers to provide any of a variety of specific functions, thereby providing unique articles. For example, the imbibing material or filler may be a liquid, solvent solution, solvent dispersion or solid. Such filler may be imbibed by any of a number of known methods which results in the deposition of such fillers within the porous structure of the microporous sheet. Some imbibing materials are physically placed within the microporous sheet. In some instances, the use of two or more reactive components as the imbibing materials permits a reaction within the microporous sheet structure. Examples of imbibing materials include antistatic agents, surfactants, odorants, antioxidants, UV stabilizers and solid particulate material such as activated carbon, polymeric coatings and pigments. Certain materials such as antistatic agents or surfactants, may be imbibed without removal of the compound or compatible liquid used as a carrier for the filler.

The flame retardant microporous article of the present invention may contain at least one layer of the above-described microporous material with at least one additional porous or non-porous layer. By way of example, in a three-layer system the above-described microporous layer is preferably the center layer sandwiched by, i.e., in between additional porous or non-porous layers. The additional layers of a multilayer article may include non-woven fabrics scrims or webs, woven fabrics or scrims, porous film, and non-porous film. Such materials may be bonded or laminated to the microporous film by, for example, pressing the microporous film and the web together in a nip between a smooth roll and a second roll (preferably having an embossing pattern on its surface) and heated sufficiently to soften the material facing the metal roll. Other bonding means such as are know in the art may also be used. Alternatively materials may be laminated by means of adhesives such as pressure-sensitive or hot-melt adhesives.

Multilayer microporous films of the present invention can be prepared directly by coextrusion, for example, with the outermost layers being preferably non flame retardant. Frequently, incorporation of a flame retardant into one or both of the outermost layers can degrade the surface and/or mechanical properties of the outermost layer. Halogenated organic flame retardants, for example, may tend to migrate to the surface of the microporous film and render the surface non-amenable to further coating, by a pressure sensitive adhesive for example. Alternatively, the films can be made with one or both of the outermost layers being flame retardant layer(s) depending on the application.

The microporous film may be formed by extrusion (or coextrusion for a multilayer article) followed by cooling to cause phase transition and then orientation to form a porous film structure. The temperatures and other process conditions depend on the type of materials used and the properties desired from each layer, and are known or readily determined by those in the art. The coextrusion may employ a feedblock or a multi-manifold die at the extruder discharge. Cooling preferably is done by casting the multi-layer film onto a casting wheel or drum. In addition, the multi-layer film can be made by lamination means. Multilayer films comprising at least one flame retardant microporous layer may be prepared using a variety of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded.

For example, one technique for manufacturing multilayer films of the present invention can use a coextrusion technique, such as that described in U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The particular extruder is generally not critical to the process. A number of useful extruders are known and include single and twin screw extruders, batch-off extruders, and the like. Conventional extruders are commercially available from a variety of vendors such as Davis-Standard Extruders, Inc. (Pawcatuck, Conn.), Black Clawson Co. (Fulton, N.Y.), Berstorff Corp. (Ky.), Farrel Corp. (Conn.), and Moriyama Mfr. Works, Ltd. (Osaka, Japan).

Flame retardant additives are added in sufficient amounts to render the multilayer film flame retardant. Generally the additives are added in amounts of 10 parts by weight or more in each flame retardant layer. Preferably the additives are added in amounts of at least 20 to 60 parts by weight in each flame retardant layer, or in the amounts of 10 to 60 parts by weight of the unified multilayer film. Advantageously, such multilayer constructions improve flame retardant efficiency; the same flame retardant properties may be obtained using an lesser amount of flame retardant additive relative to a single layer construction.

The microporous articles of the present invention may be employed in any of a wide variety of situations wherein microporous structures may be utilized. The articles are especially useful in applications where there is a possibility of exposure to heat or an ignition source. By incorporating flame retardant additives into a microporous article, porous films are provided which are difficult to ignite, which propagate flame much more slowly and which may be self-extinguishing. Such applications include clothing, wall or roofing barriers (such as moisture vapor transmission barriers), optical films in electronic devices (such as light reflective and dispersive films), printing substrates and electrical insulation.

The flame retardant microporous films of the invention are particularly useful as barrier films (e.g. moisture-vapor barrier films) in construction, such as on roofs or exterior walls. These films can render a building (or portion thereof) moisture-resistant by allowing water vapor to pass through the film, but not liquid water. In many places building materials are subject to increasingly severe restrictions regarding flammability; building codes may require that barrier films be non-flammable or fire-resistant. The films are attached to the building exterior to the sheathing and beneath the roofing tiles, shingles, etc. of a roof or beneath the exterior siding, shingles or panels of an exterior wall. The microporous film may be single or multilayer, and may preferably include a scrim or web for added strength or tear resistance. The film may be attached to an exterior surface by any conventional means such as nails, tacks, staples or adhesives.

The microporous articles of the present invention are also useful in a variety of light management applications such as diffuse reflectors. For example, they may be used as a back reflector in liquid crystal display (LCD) and light emitting diode (LED) backlight constructions. The diffuse reflective materials of the present invention may also be used to increase the brightness of sign cabinets, light fibers, and light conduits. The light diffusing article may be used to partially line an optical cavity to increase the efficient use of light to illuminate such things as, for example, a partially transparent image that may be either static (such as a graphics film or a transparency) or switchable (such as a liquid crystal display). Thus, optical cavities that are partially lined with diffuse reflector films of the invention may be used in such devices as backlight units such as liquid crystal display constructions (LCDs), lights, copying machines, projection system displays, facsimile apparatus, electronic blackboards, diffuse light standards, and photographic lights. They may also be part of a sign cabinet system, a light conduit or units containing light emitting diodes (LEDs).

Thus, for example, the diffuse reflective article of the present invention has been found to be especially beneficial as a back reflector in commercial back lights used for liquid crystal displays. In this type of application, the film is placed directly behind the light source which is illuminating a display. The porous film simply acts to reflect back all the light which is not directed toward the display and ultimately a viewer. The scattering or diffuse reflection characteristics of the porous film back reflector also helps provide a more overall diffuse light source and more evenly lit display, and are suitable as diffuse reflector and polarization randomizers as described in U.S. pat. application Ser. No. Publication No. WO 95/17699 and U.S. patent application Ser. No. 08/807262 filed Feb. 28, 1997.

Such articles containing the flame retardant diffuse reflective material of the present invention are further aspects of the present invention.

The unique morphology resulting from diffuse reflectors made via the solid/liquid process is particularly useful in making a practical reflector having high diffuse reflection and flame retardancy. The morphology of the solid medium has small dimensions because it is formed by phase separating a polymer and a diluent from a solution. The articles have solid and air regions (or void spaces) of a particular size and comprise materials that do not absorb radiation in the wavelength desired to be diffusely reflected. Thus, for the diffuse reflection of visible light, 380–730 nanometers, the polymer materials preferred are, for example, polyolefins such as polypropylene, polyethylene; copolymers of ethylene and vinyl acetate, or compatible mixtures thereof. Also, because diluent and flame retardant may be present in varying amounts, they should also be non-absorbing.

The films of the present invention can also be prepared in a manner to make them repellent to water, acids, bases, oils, alkanes, alcohols and many other industrial solvents. The addition of a fluorocarbon additive blended in the diluent appears to impart such properties.

In the following non-limiting examples, all parts and percentages are by weight unless otherwise indicated. In evaluating the materials of the invention and the comparative materials, the following test methods are used.

EXAMPLES

This invention is further illustrated by the following examples that are not intended to limit the scope of the invention. In the examples, all parts, ratios and percentages are by weight unless otherwise indicated. The following test methods were used to characterize the flame retardant films in the examples:

Test Methods
Horizontal Burn

Burning characteristics of the films were evaluated according to the horizontal burn test for the UL 94 HB standard. Film samples were cut into strips having a width of 13 mm and a length of 125 mm. Marks are made on each strip at 25 mm and 100 mm. Three strips are prepared and tested for each film material tested. Each strip is placed in a support fixture (as described in UL 94 HB) such that the sample's length is horizontal and width is at an angle of 45 degrees. The strip is positioned such that at least 20 mm of the strip is extended from the fixture. The extended end is ignited using a laboratory burner containing a 20 mm flame and the fixture is moved such that 20 mm of unburned sample film is always extended from the fixture. The flame is applied for 30 seconds or until the flame front reaches the 25 mm mark. If the flame front reaches the 25 mm mark, a timer is started and the time is measured until the flame to reach the 100 mm mark. The material passes the UL 94 HB standard, for each of the three strips, if the burn rate does not exceed 75 mm per minute or it ceases to burn before the 100 mm mark. A deviation from the test standard was that samples were not conditioned at 23+/−3° C. and 50+/−5% relative humidity. Generally, conditioning and testing was conducted at 21–24° C. and 20–40% relative humidity.

Vertical Burn

Burning characteristics of the films were evaluated according to a vertical burn test similar to the DIN 4102 B2Standard. Surface tests were run on four samples for each Example by placing a sheet of each sample in a vertical frame having a width of about 110 mm and a length of 240 mm. Two parallel horizontal lines are drawn at 40 mm and 190 mm from the bottom edge on the film. The frame is hung in a fume hood with virtually no air current as measured with a pressure drop of less than 0.002 inches (0.5 N/m$^2$) of water using a Micro-Monitor II manometer (available from M-Tec Corp., Morrisville, Pa.). The lower line is contacted with the butane flame oriented at an angle of 45° with a flame height of about 20 mm for 15 seconds. The time for the advancing burning front to reach the upper line is measured. If time is greater than 20 seconds or if the flame is extinguished before reaching the second line for all four samples then the sample passes the DIN standard. The tests deviated from the standard in that samples were not conditioned at 23° C. and 50% relative humidity. Rather, conditioning was conducted at 21–24° C. and 20–40% relative humidity.

Gurley Air Flow

This value is a measurement of time in seconds required to pass 50 cc of air through a film according to ASTM D-726 Method B. A value of greater than 10,000 sec/50 cc is assigned if the Gurley timer does not start after 100 seconds from the start of the test.

Tensile Strength

Tensile properties of the films were evaluated using a standard tensile/elongation method on an Instron mechanical testing frame at 12 inches/minute (30.5 cm/minute). Each sample was cut to have a width of 2.5 cm (1.0 inches) and a gauge length of 5.1 cm (2.0 inches). Thickness of the samples varied with process conditions and was measured using a TMI Thickness Gage.

Reflectance Spectra Measurement

The total reflectance spectra was determined by using the procedures similar to those described in ASTM E 1164-94 except a different standard was used: Spectralon™, a sintered polytetrafluoroethylene having a diffuse reflectance of about 99% (available from Labsphere Inc., North Sutton, N.H.) and the reflectance measurements were normalized to the standard having a reflectance of 100%. A sample was placed in a Lambda 900 UV/VIS/NIR Spectrometer (available from Perkin Elmer). The output was a percent reflectance for each wavelength over a predetermined range of wavelengths of from 380 nm to 730 nm.

Materials Used

| Material | Description |
|---|---|
| DS 5D45 | Crystallizable polypropylene, melt flow index of 0.65 dg/min (ASTM D1238, Condition I), crystallinity of 48%, a melting point of 165° C. (measured by DSC) and an index of refraction of 1.50, available from Shell Chemical Co.. |
| Millad ™ 3905 | A nucleating agent, dibenzylidine sorbitol, available from Milliken Chemical, Inman SC. |
| Mineral oil | A transparent oil, having a viscosity of 100 centistokes (ASTM D445 at 40° C.) and an index of refraction of 1.48, available as Mineral Oil Superla White No. 31 from Amoco Chemical Co. |
| DE 83 | Decabromodiphenyloxide, average particle size of 4 μm, available from Great Lakes Chemical, West Lafayette, IN. |
| DE 79 | Octabromodiphenyl oxide, available from Great Lakes Chemical. |
| PE 68 | Tetrabromobisphenyl A bis (2,3-dibromopropyl ether), Available from Great Lakes Chemical. |
| HDPE | High density polyethylene, refractive index of 1.54, available as polyethylene resin 1285 from Fina Oil and Chemical Co., Dallas, TX. |

Examples 1–5 and Comparative Example 1

The effect of flame retardant concentration on single layer microporous films was demonstrated.

In Example 1, the polymer component, DS 5D45, was mixed with a nucleating agent, MILLAD™ 3905, and fed into the hopper of a 25 mm twin-screw extruder. A transparent diluent, mineral oil, was introduced into the extruder through an injection port at a rate to provide a composition of 50% by weight of the polymer, 40% by weight mineral oil and 1500 parts by weight of MILLAD™ 3905 nucleating agent per million parts of the total composition. DE 83 was introduced as a powder into the feed throat of the extruder at a rate sufficient to result in a weight ratio of flame retardant to polymer to diluent of 10:50:40. The overall feed rate was 3.6 kg/hr. The polymer was heated to 271° C. in the extruder to melt and, after mixing with the diluent and flame retardant, the temperature was maintained at 188° C. during the extrusion. The melt was extruded through a 20.3 cm-wide coat hanger slit die and cast as a 508 micrometer thick transparent film onto a casting drum maintained at 82° C. and having smooth surface. The transparent cast film was stretched 2×2 in a sequential stretching frame and then heat set at 121° C. for 5 minutes to form an opaque film having a thickness of about 250 micrometers.

Examples 2–4 were made as Example 1 except process conditions were changed to form a film made of flame retardant, polymer and diluent in a weight ratio of 20:40:40, 30:35:35 and 40:30:30, respectively.

Example 5 was extruded as in Example 2 and then washed in 1,1-dichloro 2,2,2-trifluoroethane (available as VERTREL™ 423 from duPont) for 1 hour and 15 minutes, dried, and then stretched 2×2 and heat-set at 121° C.

Comparative Example 1 was made as in Example 1 except process conditions were changed to form a film made of polymer and diluent in a weight ratio of 50:50, no flame retardant, and the film thickness was about 315 micrometers. A 40 mm extruder was used with a total flow rate of 22.7 kg/hour. The melting section of the extruder was maintained at 271° C. and the mixing/conveying section was maintained at 177° C. The melt was extruded though a 38.1 cm wide coat hanger slit die and cast onto a smooth-surfaced casting drum maintained at 66° C. The film was stretched 2×2 in a length orienter and tenter and then heat set at 121° C.

Examples 1–5 and Comparative Example 1 were tested for horizontal burn, Gurley air flow and tensile strength. Results are shown in Table 1.

TABLE 1

| Example | FR wt % | Horizontal Burn Test | Gurley sec/50 cc | Tensile kPa |
|---|---|---|---|---|
| 1 | 10 | fail | 1200 | 16548 |
| 2 | 20 | ceased to burn | 370 | 8963 |
| 3 | 30 | ceased to burn | 300 | 7584 |
| 4 | 40 | ceased to burn | 70 | 5930 |
| 5 | 33* | ceased to burn | 61 | 7143 |
| C1 | 0 | fail | 440 | 12478 |

*calculated after extraction

As seen from the data, the films of this invention are exceptionally flame retardant when compared to a conventional oil-in microporous film.

Comparative Example 2 and Examples 6–8

The effect of flame retardant concentration on multilayered microporous films having an A(BA)$_5$BA structure with alternating B layers containing flame retardant was demonstrated.

In Comparative Example 2, the non-flame retardant "A" layers were made of DS 5D45 polypropylene, MILLAD™ 3905 nucleating agent, and mineral oil. These materials were melt mixed and conveyed in a 40 mm twin-screw extruder operating with zone temperatures set at 271° C. in the melting section and 177° C. in the mixing and conveying section. The extrudate was pumped to the "A" slots of a feedblock having 13 slots. The flow rates were adjusted to provide a non flame retardant composition of polymer and diluent in a weight ratio of 50:50 and a nucleating agent concentration of 1000 parts by weight of nucleating agent per million parts of combined polymer and diluent.

The flame retardant "B" layers were made of DS 5D45 polypropylene, MILLAD™ 3905 nucleating agent, mineral oil and DE 83 flame retardant. These materials were mixed and conveyed in a 25 mm twin-screw extruder operating with zone temperatures set at 271° C. in the melting section and 204° C. in the mixing and conveying section to the "B" slots of the feedblock. The feedrates were such that the extrudate had a flame retardant/polymer/diluent oil composition of 30:35:35 and a nucleating agent concentration of 1500 parts by weight of nucleating agent per million parts of the total composition.

The feedblock, made as described in U.S. Pat. No. 4,908,278 (Bland et al.), allowed two flow streams fed into the 13 slots in an alternating manner to come together in a multilayer flow stream having layers arranged as A(BA)$_5$BA. The overall mass flow rates of the two extruders was 18.1 kg/hour. The temperature of the feedblock was set at 177° C. The resulting multilayered flow stream was passed through a single orifice film die set at a temperature of 177° C., drop-cast onto a chill roll set at a temperature of 82° C. The individual flowrates of A and B were such that flame retardant material comprised a calculated 7.5 weight percent of the overall multilayered film. The transparent cast film was stretched 2×2 in a length orienter and tenter and heat set at 121° C. to form an opaque multilayer film having an overall thickness measured at about 250 micrometers.

Examples 6–8 were made essentially as in Comparative Example 2, except the flow rates of the materials were adjusted to obtain flame retardant to polymer to diluent weight ratios in the B layer of 40:30:30, 40:30:30 and 50:25:25, respectively, and overall flame retardant concentrations of 10.0, 10.0 and 12.5 weight percent, respectively. The thickness of the multilayer films were 220, 315 and 315, respectively.

Figure 2:
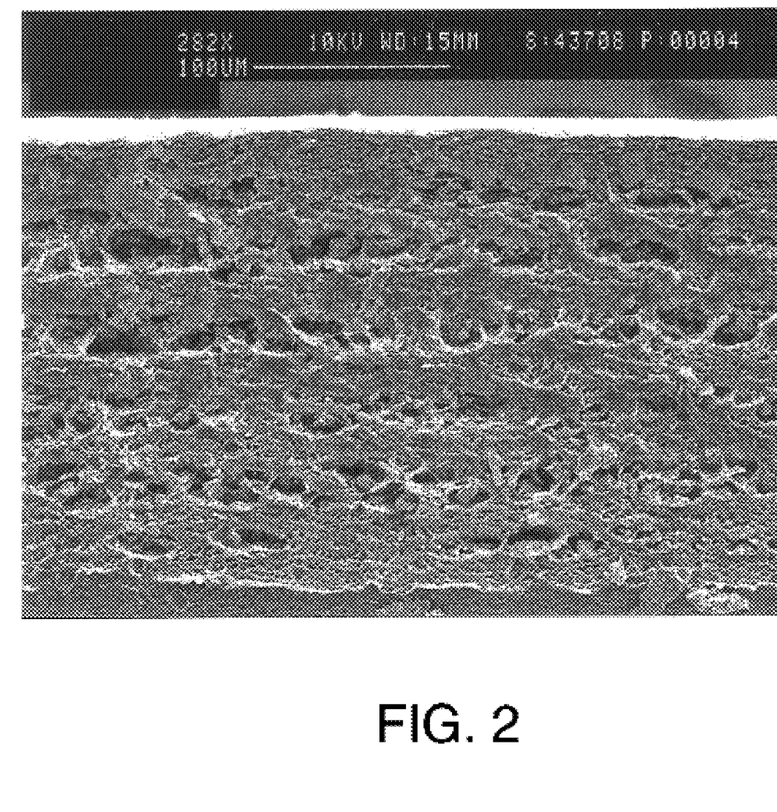
FIG. 2 is a digital image of a scanning electron micrograph (SEM) the film of Example 8 having an $A(BA)_5BA$ multilayer construction. The film is an oriented microporous polypropylene containing 12.5 wt. percent decabromodiphenyl oxide. The diluent, but not the flame retardant, has been extracted for the purposes of obtaining the micrograph.
Figure 3:
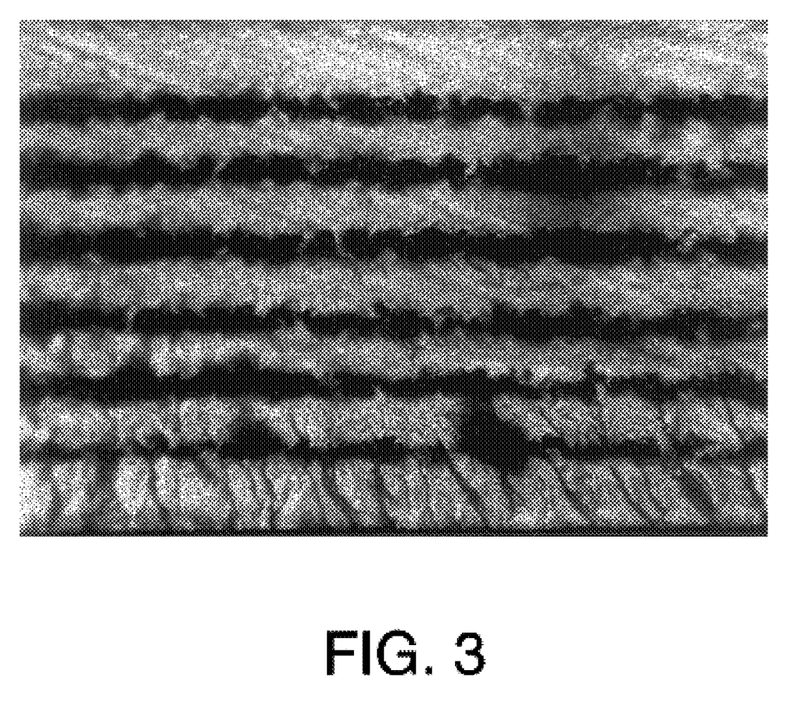
FIG. 3 is a digital image of a photomicrograph of a cross section of the film of Example 8 prior to orientation and diluent extraction at 162× magnification.

A SEM and photomicrograph of the film of Example 8 can be seen as FIGS. 2 and 3 respectively. Particles of the flame retardant additive are visible in the Figures. In FIG. 3, a cross-section of the sample was placed in a light microscope and illuminated from behind (transmission mode) such that the layers containing no flame retardant appear light due to the high light transmittance of unoriented mineral oil-filled polypropylene film and the flame retardant filed layers appear dark due to the light scattering off the flame retardant particles. In this example the flame retardant was chosen so that is would not be extracted during the oil removal step.

Examples 6–8 and Comparative Examples 1–2 were tested for horizontal burn, Gurley air flow and tensile strength. Results are shown in Table 2.

TABLE 2

| Example | Flame retardant wt % | Horizontal Burn | Gurley sec/50 cc | Tensile kPa |
|---------|----------------------|-----------------|------------------|-------------|
| C2      | 7.5                  | fail            | 850              | 9067        |
| 6       | 10.0                 | fail            | 370              | 8550        |
| 7       | 10.0                 | fail            | 300              | 8205        |
| 8       | 12.5                 | Ceased to burn  | 100              | 8205        |
| C1      | 0                    | fail            | 440              | 12478       |

Figure 4:
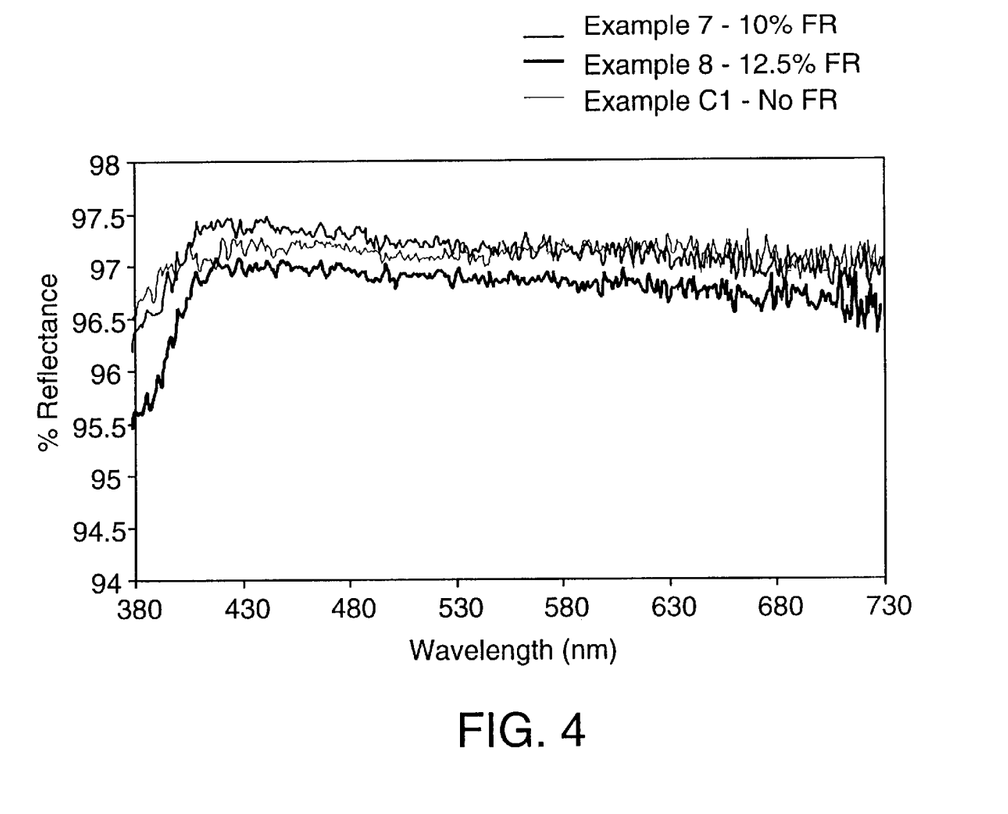
FIG. 4 is a graph of the reflectance properties of the microporous films of Examples 7 and 8, and Comparative Example 1.

Examples 7 and 8 and Comparative Example 1 were tested for reflectance using the test procedure described above. As seen in FIG. 4, all three films with nearly the same thickness had similar reflectance spectra. Surprisingly, flame retardant presence had no adverse affect on reflectance spectra.

Examples 9–11 and Comparative Examples 3–4

Examples 9–11 illustrates the effect of a melt blendable flame retardant material on the flame retardant performance of microporous films.

In Examples 9–11 microporous films were made in a manner similar to Example 1 except flame retardant DE 79 was used and some processing conditions and material ratios were changed and the stretch ratio was 1.7×1.8. A 40 mm extruder was used with the melting section temperatures set at 266° C. A pyramid patterned casting wheel was used at a set temperature of 65° C. For Examples 9–11 the weight ratios of flame retardant to polymer to diluent were 5:60:35, 10:55:35, 15:50:35, and 20:45:35 respectively, and the nucleating agent concentrations were 700, 700, 1000 and 1200, respectively. The oriented film thickness for Examples 9–11 were about 36, 46, 38, and 33 micrometers, respectively. Comparative Example 4 was made essentially as in Example 10, except no flame retardant additive was used and the polymer to diluent weight ratio was 65:35, and the nucleating agent concentration was 490 ppm.

Examples 9–11 were tested for vertical burn, Gurley air flow and tensile strength.

TABLE 3

| Example | Flame Retardant wt % | Vertical Burn  | Gurley sec/50 cc | Tensile kPa |
|---------|----------------------|----------------|------------------|-------------|
| C3      | 5                    | fail           | 69               | 21595       |
| 9       | 10                   | Ceased to burn | 45               | 19265       |
| 10      | 15                   | Ceased to burn | 40               | 14293       |
| 11      | 20                   | Ceased to burn | 44               | 16134       |
| C4      | 0                    | fail           | 80               | 27932       |

As seen from the data, the films of this invention pass the vertical burn test when the flame retardant concentration exceeds 10 weight percent.

Figure 1:
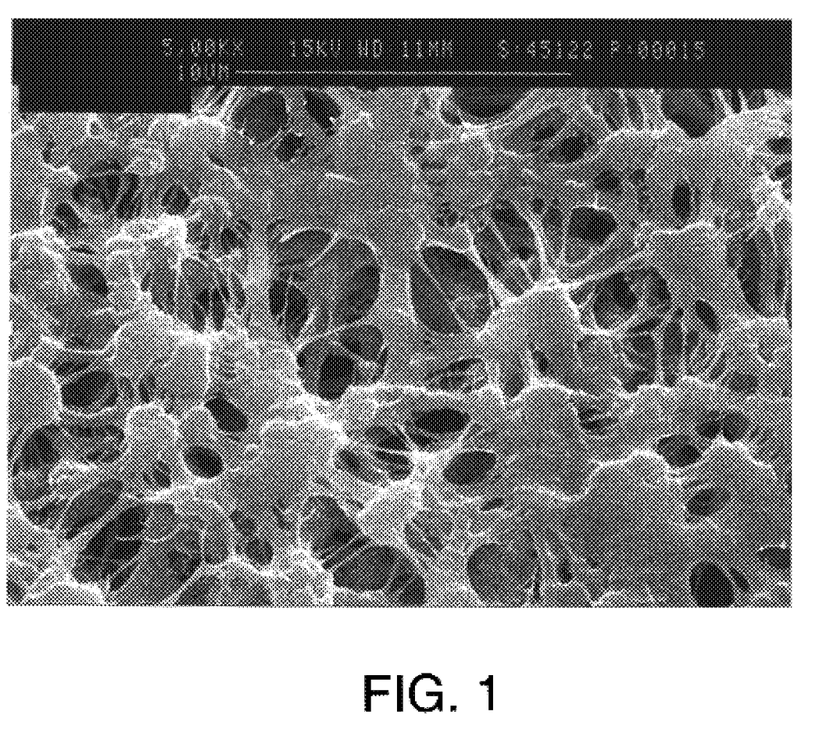
FIG. 1 is a digital image of a scanning electron micrograph (SEM) the film of Example 11. The film is an oriented microporous polypropylene containing 20 wt. percent octabromodiphenyl oxide. The diluent and flame retardant additive have been extracted for the purposes of obtaining the micrograph.

A scanning electron micrograph (SEM) of the film can be seen as FIG. 1.

Example 12

Example 12 illustrates the effect of a different polymer on flame retardant performance of microporous films. The polymer was HDPE and no nucleating agent was used. A pyramid patterned casting wheel was used set at a temperature of 38° C. The weight ratio of flame retardant (DE-83) to polymer to mineral oil diluent was 15:30:55. The oil was extracted from the film placing it in 1,1-dichloro 2,2,2-trifluoroethane for 1 hour. The film was then stretched 2×2 and heat set at 66° C. The oriented film thickness was 115 micrometers.

Example 12 was tested for horizontal burn, Gurley air flow and tensile strength.

TABLE 4

| Example | Flame retardant wt % | Horizontal burn | Gurley | Tensile |
|---------|----------------------|-----------------|--------|---------|
| 12      | 33*                  | pass            | 53     | 6833    |

*calculated after extraction

As seen in the data of Table 4, other crystalline polymers such as high density polyethylene can be used to prepare flame retardant microporous films.

Comparative Example 5

Comparative example 5 was extruded as Example 1 except that a different flame retardant was used. This flame retardant was PE-68 (tetrabromobisphenyl A bis (2,3-dibromopropyl ether)) which melts at 106–120° C., well below the processing temperature. The flame retardant to polymer to diluent ratio was again 10:50:40 with 1500 ppm of Millad 3905. The PE-68 did melt to produce a particle-free cast film; however, it fouled the heterogeneous nucleation of the Millad 3905 resulting in an extremely weak film that could not be oriented without fracture.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A microporous article comprising:
   (a) about 20 to 90 parts by weight of a crystallizable thermoplastic polymer component;
   (b) about 0.1 to 70 parts by weight of an diluent component, said diluent component being miscible with the polymer component at a temperature above the liquid-solid phase separation temperature and able to phase separate from the polymer component through crystallization separation upon cooling below the liquid-solid phase separation temperature; and (c) about 10 to 60 parts by weight of a flame retardant additive whereas when unoriented, said article is characterized by spherulites and aggregates of spherulites of crystallized thermoplastic polymer, and when oriented, said article is characterized by spherulites of crystallized thermoplastic polymer interconnected by polymer fibrils.

2. The microporous article of claim 1 comprising 15 to 40 parts by weight flame retardant additive.

3. The microporous article of claim 1 comprising greater than 10 parts by weight diluent.

4. The microporous article of claim 1 comprising 15 to 70 parts by weight diluent.

5. The article of claim 1, wherein the polymer component is a polyolefin, a polyolefin copolymer, a polyolefin blend or a mixture thereof.

6. The article of claim 5, wherein the polyolefin is polypropylene or high density polyethylene.

7. The article of claim 1, wherein the diluent is selected from the group of dioctyl phthalates, diethyl phthalates, dibutyl phthalate, mineral oil, mineral spirits, triethyleneglycol, methylnonylketone, decanoic acid, oleic acid, decyl alcohol, and a mixture thereof.

8. The article of claim 1, wherein the diluent component comprises 50 weight percent or more of a crosslinkable oil.

9. The article of claim 1 wherein the flame retardant additive is selected from the group of halogenated organic flame retardants, organic phosphorus-containing flame retardants, inorganic flame retardants and inherently flame retardant polymers.

10. A multilayer microporous film comprising at least one layer of a microporous article according to claim 1.

11. The multilayer film of claim 10 further comprising at least one additional layer selected from the group consisting of non-woven fabric, woven fabric, porous film, and non-porous film.

12. The multilayer film of claim 10 having an (AB)nA construction wherein each A layer is a non-flame retardant layer, each B layer is a flame retardant layer and n is an integer from 5 to 50.

13. A moisture barrier article comprising the microporous film of claim 1.

14. The microporous article of claim 1 comprising less than 10 parts by weight of diluent.

15. The microporous article of claim 1, wherein said flame retardant additive is selected so as to not inhibit crystal nucleation of the polymer composition during phase separation.

16. A diffuse reflector comprising the microporous article of claim 1.

17. The microporous article of claim 1, wherein said flame retardant additive melts above the liquid-solid phase separation temperature.

18. The microporous article of claim 1, wherein said flame retardant additive melts below the liquid-solid phase separation temperature.

19. The multilayer film of claim 10 comprising as lest one additional bonded layer.

* * * * *

UNITED STATES PATENT AND TRADEMARK OFFICE
CERTIFICATE OF CORRECTION

PATENT NO. : 6,171,689 B1
DATED : January 9, 2002
INVENTOR(S) : Kaytor et al.

It is certified that error appears in the above-identified patent and that said Letters Patent is hereby corrected as shown below:

Column 7,
Line 36, delete "usefull" and insert in place thereof -- useful --.

Column 15,
Line 22, delete "Ser. No." following "application" and preceding "Publication".

Column 17,
Lines 54-55, delete "VERTRELTM" and insert in place thereof -- VERTREL$^{TM}$ --.

Column 18,
Line 64, delete "Examples6-8" and insert in place thereof -- Examples 6-8 --.

Column 19,
Line 67, insert -- Results are shown in Table 3. -- following "strength.".

Column 20,
Line 31, insert -- Results are shown in Table 4. -- following "strength.".

Signed and Sealed this

Thirty-first Day of December, 2002

JAMES E. ROGAN
*Director of the United States Patent and Trademark Office*